United States Patent
Pistor et al.

(10) Patent No.: US 9,614,553 B2
(45) Date of Patent: Apr. 4, 2017

(54) ENERGY SELF-SUFFICIENT RADIOFREQUENCY TRANSMITTER

(75) Inventors: Klaus Pistor, Linden (DE); Frank Schmidt, Zorneding (DE)

(73) Assignee: ENOCEAN GMBH, Oberhacing (DE)

( * ) Notice: Subject to any disclaimer, the term of this patent is extended or adjusted under 35 U.S.C. 154(b) by 1954 days.

(21) Appl. No.: 10/304,121

(22) Filed: Nov. 25, 2002

(65) Prior Publication Data

US 2003/0143963 A1 Jul. 31, 2003

Related U.S. Application Data

(63) Continuation of application No. PCT/DE01/01965, filed on May 21, 2001.

(30) Foreign Application Priority Data

May 24, 2000 (DE) .................................. 100 25 561

(51) Int. Cl.
*H04B 1/04* (2006.01)
*H04B 1/16* (2006.01)

(52) U.S. Cl.
CPC .............. *H04B 1/0458* (2013.01); *H04B 1/04* (2013.01); *H04B 1/1607* (2013.01); *Y10T 307/50* (2015.04)

(58) Field of Classification Search
CPC ......... G08C 19/28; H04B 1/04; H04B 1/1607
USPC ........... 340/10.34, 10.1, 10.4, 10.42, 825.72, 340/825.69, 10.3, 5.52, 10.33, 10.5; 341/34; 307/116, 117; 310/311, 314, 310/318, 339
See application file for complete search history.

(56) References Cited

U.S. PATENT DOCUMENTS

| | | |
|---|---|---|
| 1,872,257 A | 8/1932 | Durkee |
| 2,565,158 A | 8/1951 | Williams |
| 2,813,242 A | 11/1957 | Crummp |
| 2,874,292 A | 2/1959 | Varley |
| 2,995,633 A | 8/1961 | Puharich et al. |

(Continued)

FOREIGN PATENT DOCUMENTS

| | | |
|---|---|---|
| DE | 24 36 225 A1 | 2/1975 |
| DE | 24 21 705 | 11/1975 |

(Continued)

OTHER PUBLICATIONS

Anonymous, *Aerospace Technology Innovation*, Technology Transfer "Wafer 'Wiggle' Going Places", vol. 9, No. 3, May/Jun. 2001, retrieved from http://ipp.nasa.gov/innovation/innovation_93/3-tt-wiggle.html, 2 pages.

(Continued)

*Primary Examiner* — Vernal Brown
(74) *Attorney, Agent, or Firm* — Foley & Lardner LLP; James De Vellis

(57) ABSTRACT

The energy self-sufficient radiofrequency transmitter has at least one electromechanical transducer with a rectifier circuit connected downstream and with a voltage converter circuit. A logic circuit configuration is connected to the voltage converter circuit. The logic circuit configuration has a sequence controller a memory in which an identification code is stored. The energy self-sufficient radiofrequency transmitter also has a radiofrequency transmission stage that is connected to the logic circuit configuration and a transmission antenna.

12 Claims, 1 Drawing Sheet

(56) References Cited

U.S. PATENT DOCUMENTS

| | | | |
|---|---|---|---|
| 3,077,574 A | 2/1963 | Marks | |
| 3,093,760 A | 6/1963 | Tarasevich | |
| 3,219,850 A | 11/1965 | Langevin | |
| 3,230,455 A | 1/1966 | Kosta, Jr. | |
| 3,270,283 A | 8/1966 | Ikrath et al. | |
| 3,315,166 A | 4/1967 | Crump | |
| 3,370,567 A | 2/1968 | Rieth | |
| 3,456,134 A | 7/1969 | Ko | |
| 3,553,588 A | 1/1971 | Honig | |
| 3,596,262 A | 7/1971 | Rollwitz et al. | |
| 3,614,760 A | 10/1971 | Zimmet | |
| 3,621,398 A | 11/1971 | Willis | |
| 3,624,451 A | 11/1971 | Gauld | |
| 3,633,106 A | 1/1972 | Willis | |
| 3,683,211 A | 8/1972 | Perlman et al. | |
| 3,697,975 A | 10/1972 | Bernstein et al. | |
| 3,735,412 A | 5/1973 | Kampmeyer | |
| 3,760,422 A * | 9/1973 | Zimmer et al. | 340/825.64 |
| 3,781,836 A | 12/1973 | Kruper et al. | |
| 3,781,955 A | 1/1974 | Lavrinenko et al. | |
| 3,796,958 A | 3/1974 | Johnston et al. | |
| 3,818,467 A | 6/1974 | Willis | |
| 3,824,857 A | 7/1974 | Smith | |
| 3,827,038 A | 7/1974 | Willis | |
| 3,866,206 A | 2/1975 | DeGiorgio et al. | |
| 3,928,760 A | 12/1975 | Isoda | |
| 3,949,247 A | 4/1976 | Fenner et al. | |
| 3,970,939 A | 7/1976 | Willis | |
| 3,971,028 A | 7/1976 | Funk | |
| 3,986,119 A | 10/1976 | Hemmer, Jr. et al. | |
| 3,989,963 A * | 11/1976 | Giaccardi | 310/318 |
| 4,001,798 A | 1/1977 | Robinson | |
| 4,004,458 A * | 1/1977 | Knothe et al. | 73/862.61 |
| 4,127,800 A | 11/1978 | Long et al. | |
| 4,160,234 A | 7/1979 | Karbo et al. | |
| 4,177,438 A | 12/1979 | Vittoria | |
| 4,177,800 A | 12/1979 | Enger | |
| 4,220,907 A | 9/1980 | Pappas et al. | |
| 4,231,260 A | 11/1980 | Chamuel | |
| 4,237,728 A * | 12/1980 | Betts et al. | 73/146.5 |
| 4,257,010 A | 3/1981 | Bergman et al. | |
| 4,259,715 A | 3/1981 | Morokawa | |
| 4,300,119 A | 11/1981 | Wiernicki | |
| 4,349,762 A | 9/1982 | Kitamura et al. | |
| 4,355,309 A | 10/1982 | Hughey et al. | |
| 4,371,814 A | 2/1983 | Hannas et al. | |
| 4,412,355 A * | 10/1983 | Terbrack et al. | 398/111 |
| 4,433,719 A | 2/1984 | Cherry et al. | |
| 4,471,353 A | 9/1984 | Cernik | |
| 4,489,269 A | 12/1984 | Edling et al. | |
| 4,504,761 A | 3/1985 | Triplett | |
| 4,510,484 A | 4/1985 | Snyder | |
| 4,521,712 A | 6/1985 | Braun et al. | |
| 4,522,099 A * | 6/1985 | Melsheimer | 84/604 |
| 4,524,283 A | 6/1985 | Latvus | |
| 4,595,864 A | 6/1986 | Stiefelmeyer et al. | |
| 4,612,472 A | 9/1986 | Kazizaki et al. | |
| 4,626,698 A | 12/1986 | Harnden, Jr. et al. | |
| 4,701,681 A | 10/1987 | Koike | |
| 4,704,543 A | 11/1987 | Barker et al. | |
| 4,739,211 A | 4/1988 | Strachan | |
| 4,748,366 A | 5/1988 | Taylor | |
| 4,786,837 A | 11/1988 | Kalnin et al. | |
| 4,870,700 A | 9/1989 | Ormanns et al. | |
| 4,878,052 A | 10/1989 | Schulze | |
| 5,012,223 A | 4/1991 | Griebell et al. | |
| 5,118,982 A | 6/1992 | Inoue et al. | |
| 5,136,202 A | 8/1992 | Carenzo et al. | |
| 5,146,153 A | 9/1992 | Luchaco et al. | |
| 5,151,695 A | 9/1992 | Rollwitz et al. | |
| 5,237,264 A | 8/1993 | Moseley et al. | |
| 5,262,696 A | 11/1993 | Culp | |
| 5,270,704 A | 12/1993 | Sosa Quintana et al. | |
| 5,278,471 A | 1/1994 | Uehara et al. | |
| 5,289,160 A | 2/1994 | Fiorletta | |
| 5,301,362 A | 4/1994 | Ohkawa | |
| 5,317,303 A * | 5/1994 | Ross et al. | 340/539.26 |
| 5,327,041 A | 7/1994 | Culp | |
| 5,339,073 A * | 8/1994 | Dodd et al. | 340/5.61 |
| 5,340,954 A | 8/1994 | Hoffman et al. | |
| 5,431,694 A | 7/1995 | Snaper et al. | |
| 5,471,721 A | 12/1995 | Haertling | |
| 5,491,486 A | 2/1996 | Welles, II et al. | |
| 5,499,013 A | 3/1996 | Konotchick | |
| 5,535,627 A | 7/1996 | Swanson et al. | |
| 5,546,070 A | 8/1996 | Ellmann et al. | |
| 5,548,189 A | 8/1996 | Williams | |
| 5,563,600 A | 10/1996 | Miyake | |
| 5,569,854 A | 10/1996 | Ishida et al. | |
| 5,572,190 A | 11/1996 | Ross et al. | |
| 5,573,611 A * | 11/1996 | Koch et al. | 152/152.1 |
| 5,578,877 A | 11/1996 | Tiemann | |
| 5,581,023 A * | 12/1996 | Handfield et al. | 73/146.5 |
| 5,581,454 A | 12/1996 | Collins | |
| 5,589,725 A | 12/1996 | Haertling | |
| 5,592,169 A | 1/1997 | Nakamura et al. | |
| 5,605,336 A | 2/1997 | Gaoiran et al. | |
| 5,631,816 A * | 5/1997 | Brakus | 363/97 |
| 5,632,841 A | 5/1997 | Hellbaum et al. | |
| 5,659,549 A * | 8/1997 | Oh et al. | 714/720 |
| 5,664,570 A | 9/1997 | Bishop | |
| 5,675,296 A | 10/1997 | Tomikawa | |
| 5,717,258 A | 2/1998 | Park | |
| 5,725,482 A | 3/1998 | Bishop | |
| 5,731,691 A | 3/1998 | Noto | |
| 5,734,445 A | 3/1998 | Neill | |
| 5,736,965 A * | 4/1998 | Mosebrook et al. | 343/702 |
| 5,741,966 A | 4/1998 | Handfield et al. | |
| 5,749,547 A | 5/1998 | Young et al. | |
| 5,751,092 A | 5/1998 | Abe | |
| 5,781,646 A | 7/1998 | Face | |
| 5,797,201 A | 8/1998 | Huang | |
| 5,801,475 A * | 9/1998 | Kimura | G01P 13/00 310/319 |
| 5,814,922 A | 9/1998 | Uchino et al. | |
| 5,816,780 A | 10/1998 | Bishop et al. | |
| 5,831,371 A | 11/1998 | Bishop | |
| 5,834,882 A | 11/1998 | Bishop | |
| 5,835,996 A | 11/1998 | Hashimoto et al. | |
| 5,839,306 A | 11/1998 | Nunuparov | |
| 5,844,516 A * | 12/1998 | Viljanen | G08C 17/02 310/36 |
| 5,849,125 A | 12/1998 | Clark | |
| 5,854,994 A | 12/1998 | Canada et al. | |
| 5,861,702 A | 1/1999 | Bishop et al. | |
| 5,861,704 A | 1/1999 | Kitami et al. | |
| 5,872,513 A | 2/1999 | Fitzgibbon et al. | |
| 5,886,647 A | 3/1999 | Badger et al. | |
| 5,886,847 A | 3/1999 | Lee et al. | |
| 5,889,464 A | 3/1999 | Huang | |
| 5,892,318 A | 4/1999 | Dai et al. | |
| 5,905,442 A | 5/1999 | Mosebrook et al. | |
| 5,911,529 A | 6/1999 | Crisan | |
| 5,918,502 A | 7/1999 | Bishop | |
| 5,923,542 A | 7/1999 | Sasaki et al. | |
| 5,933,079 A * | 8/1999 | Frink | 340/572.4 |
| 5,939,816 A | 8/1999 | Culp | |
| 5,939,818 A | 8/1999 | Hakamata | |
| 5,962,951 A | 10/1999 | Bishop | |
| 5,979,199 A | 11/1999 | Elpern et al. | |
| 5,982,355 A | 11/1999 | Jaeger et al. | |
| 5,995,017 A * | 11/1999 | Marsh et al. | 340/10.2 |
| 5,998,938 A | 12/1999 | Comberg et al. | |
| 6,014,896 A | 1/2000 | Schoess | |
| 6,025,783 A | 2/2000 | Steffens, Jr. | |
| 6,026,165 A * | 2/2000 | Marino et al. | 380/273 |
| 6,028,506 A | 2/2000 | Xiao | |
| 6,030,480 A | 2/2000 | Face, Jr. et al. | |
| 6,037,706 A | 3/2000 | Inoi et al. | |
| 6,040,654 A | 3/2000 | Le Letty | |
| 6,042,345 A | 3/2000 | Bishop et al. | |
| 6,052,300 A | 4/2000 | Bishop et al. | |
| 6,054,796 A | 4/2000 | Bishop | |
| RE36,703 E | 5/2000 | Heitschel et al. | |

(56) References Cited

U.S. PATENT DOCUMENTS

| | | |
|---|---|---|
| 6,071,088 A | 6/2000 | Bishop et al. |
| 6,074,178 A | 6/2000 | Bishop et al. |
| 6,075,310 A | 6/2000 | Bishop |
| 6,079,214 A | 6/2000 | Bishop |
| 6,084,530 A * | 7/2000 | Pidwerbetsky et al. ... 340/10.32 |
| 6,087,757 A | 7/2000 | Honbo et al. |
| 6,101,880 A | 8/2000 | Face, Jr. et al. |
| 6,111,967 A | 8/2000 | Face, Jr. et al. |
| 6,112,165 A | 8/2000 | Uhl et al. |
| 6,114,797 A | 9/2000 | Bishop et al. |
| 6,122,165 A | 9/2000 | Schmitt et al. |
| 6,124,678 A | 9/2000 | Bishop et al. |
| 6,127,771 A | 10/2000 | Boyd et al. |
| 6,130,625 A | 10/2000 | Harvey |
| 6,140,745 A | 10/2000 | Bryant |
| 6,144,142 A | 11/2000 | Face, Jr. et al. |
| 6,150,752 A | 11/2000 | Bishop |
| 6,156,145 A | 12/2000 | Clark |
| 6,175,302 B1 | 1/2001 | Huang |
| 6,181,255 B1 | 1/2001 | Crimmins et al. |
| 6,182,340 B1 | 2/2001 | Bishop |
| 6,188,163 B1 | 2/2001 | Danov |
| 6,213,564 B1 | 4/2001 | Face, Jr. |
| 6,215,227 B1 | 4/2001 | Boyd |
| 6,229,247 B1 | 5/2001 | Bishop |
| 6,243,007 B1 | 6/2001 | McLaughlin et al. |
| 6,245,172 B1 | 6/2001 | Face, Jr. |
| 6,246,153 B1 | 6/2001 | Bishop et al. |
| 6,252,336 B1 | 6/2001 | Hall |
| 6,252,358 B1 | 6/2001 | Xydis et al. |
| 6,255,962 B1 * | 7/2001 | Tanenhaus et al. ...... 340/870.05 |
| 6,257,293 B1 | 7/2001 | Face, Jr. et al. |
| 6,259,372 B1 | 7/2001 | Taranowski et al. |
| 6,278,625 B1 | 8/2001 | Boyd |
| 6,304,176 B1 | 10/2001 | Discenzo |
| 6,323,566 B1 * | 11/2001 | Meier .......................... 307/10.2 |
| 6,326,718 B1 | 12/2001 | Boyd |
| 6,362,559 B1 | 3/2002 | Boyd |
| 6,366,006 B1 | 4/2002 | Boyd |
| 6,392,329 B1 | 5/2002 | Bryant et al. |
| 6,396,197 B1 | 5/2002 | Szilagyi et al. |
| 6,407,483 B1 | 6/2002 | Nunuparov et al. |
| 6,438,193 B1 * | 8/2002 | Ko et al. ...................... 377/24.1 |
| 6,462,792 B1 | 10/2002 | Ban et al. |
| 6,529,127 B2 | 3/2003 | Townsend et al. |
| 6,567,012 B1 | 5/2003 | Matsubara et al. |
| 6,570,336 B2 | 5/2003 | Ham et al. |
| 6,570,386 B2 | 5/2003 | Goldstein |
| 6,573,611 B1 | 6/2003 | Sohn et al. |
| 6,606,308 B1 | 8/2003 | Genest et al. |
| 6,611,556 B1 * | 8/2003 | Koerner et al. ............. 375/224 |
| 6,614,144 B2 | 9/2003 | Vazquez Carazo |
| 6,617,757 B2 | 9/2003 | Vazquez Carazo et al. |
| 6,630,894 B1 | 10/2003 | Boyd et al. |
| 6,684,994 B1 | 2/2004 | Nunuparov |
| 6,700,310 B2 | 3/2004 | Maue et al. |
| 6,731,708 B1 | 5/2004 | Watanabe |
| 6,747,573 B1 | 6/2004 | Gerlach et al. |
| 6,756,930 B1 | 6/2004 | Nunuparov et al. |
| 6,768,419 B2 * | 7/2004 | Garber et al. ............. 340/572.4 |
| 6,785,597 B1 | 8/2004 | Farber et al. |
| 6,812,594 B2 | 11/2004 | Face et al. |
| 6,856,291 B2 | 2/2005 | Mickle et al. |
| 6,861,785 B2 | 3/2005 | Andre et al. |
| 6,882,128 B1 | 4/2005 | Rahmel et al. |
| 6,933,655 B2 | 8/2005 | Morrison et al. |
| 6,980,150 B2 | 12/2005 | Conway, Jr. et al. |
| 6,992,423 B2 | 1/2006 | Mancosu et al. |
| 7,005,778 B2 | 2/2006 | Pistor |
| 7,019,241 B2 | 3/2006 | Grassl et al. |
| 7,084,529 B2 * | 8/2006 | Face et al. .................... 307/116 |
| 7,230,532 B2 | 6/2007 | Albsmeier et al. |
| 7,245,062 B2 | 7/2007 | Schmidt |
| 7,389,674 B2 | 6/2008 | Bulst et al. |
| 7,391,135 B2 | 6/2008 | Schmidt |
| 7,392,022 B2 | 6/2008 | Albsmeier et al. |
| 2001/0003163 A1 | 6/2001 | Bunger et al. |
| 2002/0021216 A1 | 2/2002 | Vossiek et al. |
| 2002/0070712 A1 | 6/2002 | Arul |
| 2003/0094856 A1 | 5/2003 | Face et al. |
| 2003/0105403 A1 | 6/2003 | Istvan et al. |
| 2003/0143963 A1 | 7/2003 | Pistor et al. |
| 2003/0193417 A1 | 10/2003 | Face et al. |
| 2004/0174073 A9 | 9/2004 | Face et al. |
| 2004/0242169 A1 | 12/2004 | Albsmeier et al. |
| 2005/0030177 A1 | 2/2005 | Albsmeier et al. |
| 2005/0035600 A1 | 2/2005 | Albsmeier et al. |
| 2005/0067949 A1 | 3/2005 | Natarajan |
| 2005/0087019 A1 | 4/2005 | Face |
| 2005/0253486 A1 | 11/2005 | Schmidt |
| 2005/0253503 A1 | 11/2005 | Stegamat et al. |
| 2006/0018376 A1 | 1/2006 | Schmidt |
| 2006/0091984 A1 | 5/2006 | Schmidt |
| 2006/0109654 A1 | 5/2006 | Coushaine et al. |
| 2009/0027167 A1 | 1/2009 | Pistor et al. |

FOREIGN PATENT DOCUMENTS

| | | |
|---|---|---|
| DE | 29 43 932 A1 | 6/1980 |
| DE | 30 16 338 A1 | 11/1980 |
| DE | 3231117 | 2/1984 |
| DE | 36 43 236 A1 | 7/1988 |
| DE | 37 36 244 A1 | 5/1989 |
| DE | 4034100 | 4/1992 |
| DE | 41 05 339 A1 | 8/1992 |
| DE | 42 04 463 A1 | 8/1992 |
| DE | 42 32 127 A1 | 3/1994 |
| DE | 43 09 006 A1 | 9/1994 |
| DE | 43 12 596 A1 | 10/1994 |
| DE | 4429029 A1 | 2/1996 |
| DE | 19619311 A1 | 12/1996 |
| DE | 297 12 270 U1 | 7/1997 |
| DE | 196 20 880 | 11/1997 |
| DE | 4017670 A1 | 1/1998 |
| DE | 19826513 A1 | 12/1999 |
| DE | 100 63 305 C1 | 12/2000 |
| DE | 199 55 722 | 5/2001 |
| DE | 10301678 A1 | 8/2004 |
| EP | 0011991 A1 | 6/1980 |
| EP | 0 111 632 A1 | 6/1984 |
| EP | 0 319 781 B1 | 6/1989 |
| EP | 0 468 394 A2 | 1/1992 |
| EP | 0 627 716 B1 | 4/1994 |
| EP | 0 617 500 A1 | 9/1994 |
| EP | 0 656 612 B1 | 6/1995 |
| EP | 0673102 A1 | 9/1995 |
| EP | 0 833 756 A1 | 4/1998 |
| EP | 0 960 410 A2 | 12/1999 |
| FR | 2646021 A1 | 10/1990 |
| GB | 824126 | 11/1959 |
| GB | 2 047 932 A | 12/1980 |
| GB | 2095053 A | 9/1982 |
| GB | 2 254 461 A | 10/1992 |
| GB | 2259172 | 3/1993 |
| GB | 2 350 245 A | 11/2000 |
| HU | 175853 B | 10/1980 |
| JP | 45-9325 | 4/1970 |
| JP | 46-10442 | 3/1971 |
| JP | 55-147800 A | 11/1980 |
| JP | 57-174950 | 10/1982 |
| JP | 63-078213 A | 4/1988 |
| JP | 63-180262 A | 7/1988 |
| JP | 01-091598 | 4/1989 |
| JP | 02-040441 A | 2/1990 |
| JP | 04-012905 A | 1/1992 |
| JP | 04-321399 A | 11/1992 |
| JP | 05-175568 | 7/1993 |
| JP | 05-251785 | 9/1993 |
| JP | 05-284187 A | 10/1993 |
| JP | 6233452 | 8/1994 |
| JP | 63-016731 A | 11/1994 |
| JP | 07-226979 A | 8/1995 |
| JP | 8132321 | 5/1996 |
| JP | 08-212484 A | 8/1996 |

(56) References Cited

FOREIGN PATENT DOCUMENTS

| | | |
|---|---|---|
| JP | 08-310207 A | 11/1996 |
| JP | 09-090065 A | 4/1997 |
| JP | 09-322477 | 12/1997 |
| JP | 10-108251 A | 4/1998 |
| JP | 10-227400 A | 8/1998 |
| JP | 10-253776 A | 9/1998 |
| JP | 11-018162 | 1/1999 |
| JP | 11-161885 A | 6/1999 |
| JP | 11-186885 A | 7/1999 |
| JP | 11-248816 A | 9/1999 |
| JP | 3060608 A | 9/1999 |
| JP | 11-341690 A | 12/1999 |
| JP | 2000-078096 | 3/2000 |
| JP | 2000-297567 | 10/2000 |
| SU | 506038 | 6/1973 |
| WO | WO 94/25681 | 11/1994 |
| WO | WO 95/15416 | 6/1995 |
| WO | WO-95/29410 A1 | 11/1995 |
| WO | WO-96/15590 A1 | 5/1996 |
| WO | WO 96/28873 | 9/1996 |
| WO | WO 97/36364 | 10/1997 |
| WO | WO-98/36395 A2 | 8/1998 |
| WO | WO 98/54766 | 12/1998 |
| WO | WO 99/12486 | 3/1999 |
| WO | WO99/60364 | 11/1999 |
| WO | WO-00/02741 A1 | 1/2000 |
| WO | WO 01/67580 | 9/2001 |
| WO | WO-01/91315 A2 | 11/2001 |
| WO | WO 02/42873 | 5/2002 |
| WO | WO 03/005388 | 1/2003 |
| WO | WO 03/007392 | 1/2003 |
| WO | WO 03/049148 | 6/2003 |

OTHER PUBLICATIONS

Anonymous, *Microwaves & RF*, Jan. 2001; 40, I; Sciences Module p. 5.
J. Paradiso and M. Feldemeier, "A Compact, Wireless, Self-Powered Pushbutton Controller," Proc. 3$^{rd}$ Int'l conf. Ubiquitous Computing (Ubicom 2001), Springer-Verlag 2001, 6 pages.
Anonymous, *Wireless SAW Identification and Sensor Systems 1167-1175*, "4. Event-Driven SAW Sensors", pp. 301-308.
Colloquium on RF and Microwave Components for Communication Systems, University of Bradford, Apr. 23, 1997, 3 pages.
J. Hollingum, "Autonomous radio sensor points to new applications", *Sensor Review*, vol. 21, No. 2, 2001, pp. 104-106.
P. Glynne-Jones and N.M. White, "Self-powered systems: a review of energy sources", *Sensor Review*, vol. 21, No. 2, 2001, pp. 91-97.
Frank Schmidt, Enocean GmbH Oberhaching, "Batterielose Funksensoren", 11. ITG/GMA-Fachtagung Sensoren und Mess-Systeme, Ludwigsburg, Mar. 11-12, 2002, 18 pages.
Alfredo Vazquez Carazo and Kenji Uchino, "Novel Piezoelectric-Based Power Supply for Driving Piezoelectric Actuators Designed for Active Vibration Damping Applications," *Journal of Electroceramics*, vol. 7, No. 3, Dec. 2001, pp. 1-3.
Vandana Sinha, "Virginia-Based Electronics Research Firm to Work Manufacturer on Remotes", *The Virginian-Pilot*, Nov. 17, 2001, pp. 1-2.

Siemens R&I/Environmentally Sensitive, NewWorld IV/2000, pp. 1-7.
"Philips Semiconductors Introduces Ultra Low-Power Real-Time Clock/Calendar Chip; IC Reduces Power Consumption and Helps Reduce Size and Weight of End User Equipment", Business Wire, Apr. 8, 1998.
Batteryless Lighting Remote Control, accessed on Jul. 23, 2009, 2 pages http://www.gpi.ru/~martin/batteryless_lighting.htm.
Bult et al., "A Distributed, Wireless MEMS Technology for Condition Based Maintenance," Apr. 1, 1996, UCLA and Rockwell Science Center, presented at the Technology Showcase Mobile, Alabama Apr. 22-26, 1996, 9 pages.
Einfuhrung in die Technische Informatik und Digitaltechnik, by Dispert, H. et al., FH Kiel, 1995, 23 pgs.
Elektronik 26/1995, Drahtlos identifizieren, 1 pg.
Glas, Alexander, "How to switch over from any 4 pin SMD SAW resonator to the new EPCOS SAW resonators R8xx in QCC4A SMD package (3.5mm x 5mm)", Dec. 21, 2001, Application Note: SAW-Components, EPCOS AG, 4 pages.
Grimsehl, E., Lehrbuch det Physik, Band 2, Elektriztatslehre, 21., Auflage, Jul. 1987, pp. 320-329.
Hendrawan Soeleman et al., "Ultra-Low Digital Subthreshold Logic Circuits", Department of Electrical and Computer Engineering Purdue University, Proceedings of the 1999 International Symposium on low Power Electronics and Design.
International Search Report and Written Opinion for Application No. PCT/DE01/01965 mailed on Feb. 1, 2002.
Notice of Allowance dated Mar. 29, 2006 for U.S. Appl. No. 10/188,633.
Office Action for Japan Patent Application No. 2001-586796 (Translated), dated Mar. 9, 2011.
Office Action for Japan Patent Application. No. 2001-586796 (Translated) dated Aug. 25, 2010.
Piezopower Converter 13 compact power supply that makes electronics batteryless, accessed Jul. 23, 2009, http://www.gpi.ru/~piezopower_converter.htm.
Ross et al., "Batteryless Sensor for Intrusion Detection and Assessment of Threats", Nov. 1, 1995, Technical Report, Defense Nuclear Agency, 61 pages.
Tietze, U. et al.; "Combinatorial Logic Circuitry", Auflage 1980; 1 page.
US Office Action dated Apr. 26, 2010 for Re-Issue U.S. Appl. No. 12/399,954.
US Office Action dated Jul. 13, 2005 for U.S. Appl. No. 10/188,633.
US Office Action in U.S. Appl. No. 12/248,682 dated Aug. 25, 2010.
US Office Action in U.S. Appl. No. 12/248,682 dated Feb. 17, 2010.
US Office Action in U.S. Appl. No. 13/034,491 dated Oct. 27, 2011.
US Office Action in U.S. Appl. No. 13/456,994 dated Aug. 1, 2012.
US Office Action on U.S. Appl. No. 13/756,925 dated Sep. 11, 2013.
US Office Action on U.S. Appl. No. 14/202,947 dated Nov. 18, 2015.
US Office Action on U.S. Appl. No. 14/202,947 dated Jul. 26, 2016.
Wireless Sensors with Battery or Induction, http://grimaag.univ-ag.fr/~jcbrouze/documents/sensonet/t06-capacity-lifetime/power/1.2.1.pdf (Copy of Reference not available).

* cited by examiner

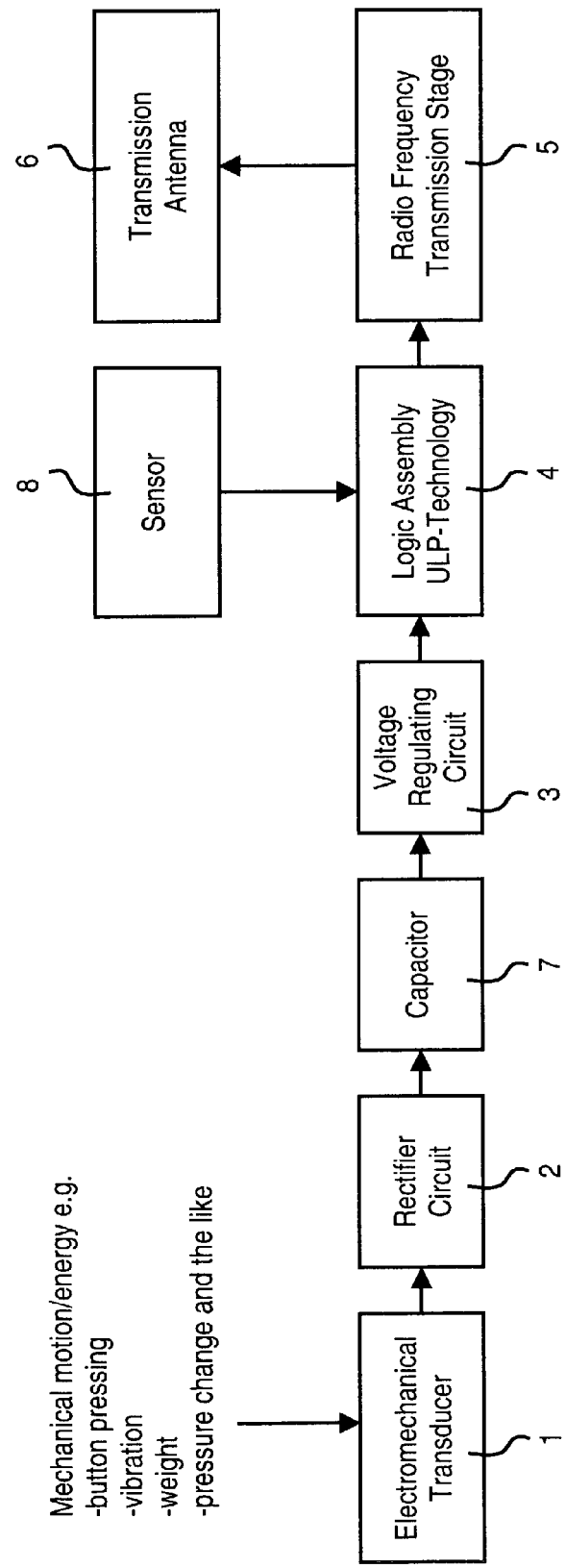

ENERGY SELF-SUFFICIENT
RADIOFREQUENCY TRANSMITTER

CROSS-REFERENCE TO RELATED
APPLICATION

This application is a continuation of copending International Application No. PCT/DE01/01965, filed May 21, 2001, which designated the United States and was not published in English.

BACKGROUND OF THE INVENTION

Field of the Invention

The invention relates to an energy self-sufficient radiofrequency transmitter, the use thereof, and also to a method for the energy self-sufficient transmission of a radiofrequency signal.

Energy self-sufficient systems in which mechanical energy is converted into electrical energy using a piezoelectric transducer and then rectified are known in the prior art. The electrical energy is used to drive simple resonant circuits.

SUMMARY OF THE INVENTION

It is accordingly an object of the invention to provide an energy self-sufficient radiofrequency transmitter and a method for the energy self-sufficient transmission of a radiofrequency signal that enable the communication of information to be improved.

With the foregoing and other objects in view there is provided, in accordance with the invention, an energy self-sufficient radiofrequency transmitter, including: at least one electromechanical transducer; a rectifier circuit connected downstream from the transducer; a voltage converter circuit; a logic circuit configuration connected to the voltage converter circuit; a radiofrequency transmission stage connected to the logic circuit configuration; and at least one transmission antenna. The logic circuit configuration includes a sequence controller and a memory for storing an identification code.

In accordance with an added feature of the invention, the electromechanical transducer includes at least one piezoelectric element.

In accordance with an additional feature of the invention, the piezoelectric element is a bending transducer.

In accordance with another feature of the invention, the electromechanical transducer includes at least one induction coil.

In accordance with a further feature of the invention, the voltage converter circuit includes an energy storage element.

In accordance with another added feature of the invention, the voltage converter circuit can be operated in a clocked manner.

In accordance with another additional feature of the invention, there is provided, at least one capacitor for storing energy. The capacitor is connected between the rectifier circuit and the voltage regulating circuit.

In accordance with a further added feature of the invention, the logic circuit configuration includes at least one component selected from a group consisting of at least one microprocessor and an ASIC.

In accordance with a further additional feature of the invention, there is provided, at least one sensor connected to the logic circuit configuration.

In accordance with yet an added feature of the invention, the logic circuit configuration is embodied using ULP technology.

In accordance with yet an additional feature of the invention, the logic circuit configuration has clock generator including an LC resonant circuit or an RC resonant circuit.

In accordance with yet another feature of the invention, the radiofrequency transmission stage is constructed for transmitting a radiofrequency signal having a frequency of greater than 1 MHz.

In accordance with yet a further feature of the invention, the radiofrequency transmission stage is constructed for transmitting a radiofrequency signal having a frequency between 100 MHz and 30 GHz.

In accordance with yet a further added feature of the invention, the radiofrequency signal can have a bandwidth of more than 100 kHz.

In accordance with yet another added feature of the invention, a delay device is connected between the logic circuit configuration and the transmission antenna.

With the foregoing and other objects in view there is provided, in accordance with the invention, a method for energy self-sufficiently transmitting a radiofrequency signal. The method includes: using an electromechanical transducer to convert a mechanical movement into a voltage signal; obtaining a rectified voltage signal by rectifying the voltage signal; converting the rectified voltage signal to produce a voltage level that is constant at least in sections; after converting the rectified signal, using the rectified voltage signal to supply energy to at least one logic circuit configuration; using the logic circuit configuration to communicate at least one identification code to a radiofrequency transmission stage; and using the radiofrequency transmission stage and a transmission antenna to radiate a radiofrequency signal containing the identification code.

In accordance with an added mode of the invention, the step of using the logic circuit configuration to communicate the identification code to the radiofrequency transmission stage includes: reading out the identification code from a memory of the logic circuit configuration; generating a transmission telegram including the identification code; activating the radiofrequency transmission stage; and modulating a radiofrequency oscillation with the transmission telegram.

In accordance with an additional mode of the invention, the method includes providing measurement data obtained from at least one sensor to the logic circuit configuration; and impressing the measurement data on the radiofrequency signal.

In accordance with another mode of the invention, the method includes radiating a plurality of radiofrequency signals one after another; each one of the plurality of the radiofrequency signals having a complete information content.

In accordance with a further mode of the invention, the method includes variably setting a time interval of individual ones of the plurality of the radiofrequency signals with respect to one another.

In accordance with a further added mode of the invention, the method includes variably setting a frequency of individual ones of the plurality of the radiofrequency signals with respect to one another.

In accordance with a further additional mode of the invention, the method includes encrypting information of the radiofrequency signal.

In accordance with yet an added mode of the invention, the method includes differently encrypting a plurality of radiofrequency signals.

In accordance with yet an additional mode of the invention, the method includes radiating the radiofrequency signal in a time-delayed manner.

In accordance with another added mode of the invention, the method includes transmitting the radiofrequency signal with a bandwidth greater than 100 kHz.

In accordance with another additional mode of the invention, the method includes transmitting the radiofrequency signal with a frequency of greater than 1 MHz.

In accordance with a further mode of the invention, the method includes transmitting the radiofrequency signal with a frequency of between 100 MHz and 30 GHz.

To that end the radiofrequency transmitter has at least one electromechanical transducer with a rectifier circuit connected downstream and at least one voltage converter circuit. A logic circuit configuration is connected to the voltage converter circuit. The logic circuit configuration includes at least one sequence controller and a memory in which an identification code is stored. A radiofrequency transmission stage is connected to the logic circuit configuration and is controlled by the logic circuit configuration. The radiofrequency signals generated by the radiofrequency transmission stage are radiated by at least one transmission antenna.

An electromechanical transducer is understood to be a general component in which mechanical energy can be converted into electrical energy, for example, a piezo-electric, electrostrictive or magnetostrictive element or an electromagnetic induction coil.

The mechanical energy can be generated, for example, from:
- a manual actuation of a switch, pushbutton or another operating element;
- a directed mechanical force action, for example the opening or closing of windows or doors or stop switches in industrial installations;
- a pressure change, for example in liquids or gases; or
- a vibration, for example, on machines, wheels, vehicles.

The voltage generated by the transducer is rectified by the rectifier circuit and is then forwarded to a voltage converter. The voltage converter ensures that a constant voltage can be tapped off at least over a short period of time. As a result, voltage spikes are avoided, and moreover, the operating reliability is increased.

The connection between the rectifier and the voltage converter can be effected directly or via a current storage element that is additionally present, e.g. a capacitor. When a capacitor is present, by way of example, the downstream voltage converter can convert a typically exponentially falling charging voltage of the capacitor into a constant voltage at least for a short time. However, the converter can also store the electrical voltages itself.

Given the presence of a sufficient voltage signal for supplying energy to the logic circuit configuration, the logic circuit configuration communicates at least one identification code, and if appropriate, other information as well, for example sensor measurement signals, to the radio-frequency transmission stage. In the radiofrequency transmission stage, the voltage signal is used to generate a radiofrequency signal containing the identification code and to radiate it via the transmission antenna.

This method for the energy self-sufficient communication of signals has the advantage that the degree of utilization of the energy supplied by the transducer, with respect to the information density that can be emitted, is very high.

Although such a system consumes a higher electrical energy per unit time compared with simple resonant circuits it is nonetheless possible to transmit a more than proportionally high information density per unit time relative thereto. Altogether, this results in a better utilization of the electrical energy made available by the transducer.

In order to achieve a high efficiency and a compact design, it is advantageous if the electromechanical transducer contains at least one piezoelement, in particular a piezoelectric bending transducer.

It is also preferred, e.g. in order to achieve an inexpensive construction, if the electromechanical transducer contains at least one induction coil.

In order to ensure a sufficiently long energy supply, it is advantageous if at least one energy storage element, e.g. in the form of a capacitor, for storing current is present between the rectifier circuit and the voltage converter circuit.

In order to increase the efficiency, it is favorable, moreover, if the voltage converter circuit is equipped with a further energy storage element. In particular, this is favorable if the voltage converter circuit is operated in a clocked manner.

It is additionally favorable if the logic circuit configuration is connected to at least one sensor. As a result, in addition to the identification code, measurement data from the at least one sensor can also be acquired or read out by the logic circuit configuration and the measurement data can be impressed on the radiofrequency signal.

It is also advantageous if, given a voltage supply over a sufficiently long time, a plurality of radiofrequency signals with complete information content are radiated one after the other, because this redundancy creates an increased communication reliability.

For increased security against interception, it is advantageous if the information of the radiofrequency signal is encrypted, typically by an encryption logic integrated into the logic circuit configuration. As a result, it is also possible to increase the transmission reliability by inputting individual keys, for example for access control purposes. In particular, when transmitting a plurality of radiofrequency signals, it is favorable if each of the radiofrequency signals is encrypted differently, e.g. with a different key.

Moreover, in order to suppress a transmission disturbance, it is favorable if, when transmitting a plurality of radiofrequency signals, their time interval with respect to one another is variable and/or the frequency of the individual radiofrequency signals differs.

Likewise for the purpose of increased transmission reliability, in particular in environments with a plurality of radiofrequency transmitters, it is advantageous if the radiation of the radiofrequency signal is time-delayed, for example by the variable, e.g. statistical, setting of a delay. The delay can be realized, for example, in the software of the logic circuit configuration. Using radiofrequency transmitters with in each case a statistically distributed delay time of their delay devices makes it possible to increase the transmission probability.

In order to reduce the energy consumption of the radiofrequency transmitter, it is advantageous if the logic circuit configuration is embodied using ultra low power technology (ULP technology).

It is advantageous if the logic circuit configuration contains a microprocessor or an ASIC (Application-Specific Integrated Circuit) module.

Typically, part of the electrical energy provided by the transducer is used to run up the logic circuit configuration into an operating state. To that end, an oscillating crystal is normally provided as a clock generator. For shortening the time for running up the logic circuit configuration, it is favorable if, instead of an oscillating crystal, an LC resonant circuit or an RC resonant circuit is present as the clock generator.

In order to achieve a high data transmission rate, it is advantageous if a signal with a frequency of >1 MHz is transmitted using the radiofrequency transmission stage. By way of example, frequencies F of between 100 MHz and 30 GHz are realized in technology nowadays. However, there is no fundamental upper limit for the frequency.

In order to achieve a high data throughput within a short time, it is advantageous if the bandwidth of the radiofrequency signal is at least 100 KHz.

It is preferred if, during a transmission cycle, the logic circuit configuration:

reads out the identification code, for example, from a memory of the logic circuit configuration;

generates a transmission telegram containing at least the identification code, and if appropriate, other information, for example, measurement data from sensors;

activates the radiofrequency transmission stage; and modulates the transmission telegram onto the radiofrequency oscillation, and if appropriate, encrypts it and/or subjects it to a time delay.

The use of the radiofrequency transmitter is particularly advantageous in traffic technology, in particular automotive technology and rail technology, and/or in building technology, in particular installation technology, for example for controlling domestic appliances, electrical installations or for access control purposes.

Individual aspects of using the radiofrequency transmitter will now be described in more detail schematically using a mechanically fed light switch as an application. It goes without saying, however, that the invention is not restricted to this specific application.

a) voltage generation:

To generate voltage, i.e. to convert mechanical energy into electrical energy, a piezoelectric bending transducer is used which, e.g. in the case of a force action of 5 N, experiences a flexure of 5 mm and builds up a resulting electrical voltage of 50 V across its inherent capacitor of 50 nF. Transducers with these parameters are known in the prior art and match a commercially available light switch well in terms of the dimensions and mechanical requirements.

b) Voltage conditioning:

Voltage stabilization is obtained by using a prior art voltage converter with a high efficiency and a high input voltage dynamic range. If the charging voltage across the capacitor then falls during operation e.g. from 20 V to 5 V, the stabilization circuit provides a constant 3 V at the output.

c) Energy consideration:

The following energy consideration is intended to show that it is possible to operate a processor circuit and a radiofrequency transmitter for a short time with the energy generated in our exemplary embodiment:

Let the electrical energy in the bending transducer be $E=\frac{1}{2} C \cdot U^2 = \frac{1}{2} \; 50 \cdot 10^{-9} \cdot 50^2$ $[V^2 \; As/V]=62.5$ 2 µWs, and approximately 50 µWs thereof remain given 80% efficiency of the transducer. An electronic circuit requiring e.g. approximately 20 mW (3 V and 6.6 mA) can thus be operated for a time duration of t=50 µWs/20 mW=2.5 ms.

d) Transmission rate and volume of data:

If a modulation rate of the radiofrequency transmitter of 100 Kbits/s is assumed, then data with a scope of approximately 250 bits can be emitted in this time. This volume of data suffices for encrypting the identity of the switch and also affords the possibility of increasing the transmission reliability by repeated emission or the application of correlation methods. Moreover, the use of the logic circuit configuration, typically a microprocessor or an ASIC, allows encryption of the data to be transmitted.

e) Radiofrequency transmitter:

The radiofrequency transmitter is based on a power of 1 mW, which suffices to reliably transmit data to every point within a private residence. In this case, a typical scenario is that all the switches, for example light switches, upon actuation, emit one or a plurality of radiofrequency telegrams which are received by a single receiver and the latter initiates the corresponding actions (lamp on/off, dimming of lamp, etc.).

It goes without saying that the energy self-sufficient radiofrequency transmitter is not restricted to an application in building technology, but rather can be used universally. Examples of possible fields of application are switch applications such as manually actuated emergency transmitters, access authorization interrogations, remote controls, other switches, limit switches in industry, traffic, in private households, in meters for water, gas and electricity, as motion detectors, animal monitoring, break-in/theft protection, and generally in automotive technology for reducing the wiring harness in motor vehicles, or in railroad systems.

An example of an appropriate sensor system application is a sensor for temperature, pressure, force and other measurement quantities, in particular for measuring automobile tire pressure and temperature, axle temperature and accelerations on trains, and the temperature or pressure force of motors and installations in industry.

Other features which are considered as characteristic for the invention are set forth in the appended claims.

Although the invention is illustrated and described herein as embodied in an energy self-sufficient radiofrequency transmitter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The sole drawing FIGURE schematically shows the different functional units of the radiofrequency transmitter.

DESCRIPTION OF THE PREFERRED EMBODIMENTS

Referring now to the sole drawing FIGURE in detail, there is shown an electromechanical transducer 1, preferably a piezoelectric bending transducer or an induction coil that enables mechanical energy to be utilized for charge separation and thus for voltage generation. The mechanical energy originates for example from a mechanical force action, (e.g. button pressing) from a pressure change or a vibration. The voltage generated is used to charge a capacitor 7 via a rectifier circuit 2. Alternatively, direct feeding of the voltage regulating circuit 3 is also possible, and by way of example, the transducer 1 can store the charges itself. The downstream voltage conversion is advantageous in order to generate, from the exponentially falling charging voltage of the capacitor 7, a voltage that is constant over a short period of time for operating the downstream electronics.

The constant voltage is used to activate and supply the downstream logic circuit configuration 4 and radiofrequency transmission stage 5 as long as the stored energy permits this. The logic circuit configuration 4 contains a microprocessor sequence controller, a memory in which the identity of the measurement location or of the switch is stored, and (optionally) sensor inputs via which one or a plurality of sensors 8 can be connected.

If a supply voltage is available due to a mechanical energy feed, then the following processor-controlled sequence is initiated:

a) reading-out the identification code;
b) reading-out the connected sensors 8 (optional);
c) encrypting the data (optional);
d) generating a transmission telegram containing the identification code;
e) activating the radiofrequency transmission stage 5; and
f) modulating the radiofrequency oscillation with the transmission telegram (optionally a number of times as long as sufficient energy is available or until a different termination criterion is reached).

The radiofrequency transmission stage 5 generates a radiofrequency oscillation that is radiated via the transmission antenna 6. The transmission telegram generated by the logic circuit configuration 4 is modulated onto the oscillation.

We claim:

1. A switching system comprising:
   an electromechanical generation means for generating an oscillating voltage;
   a rectifier electrically connected to said generation means;
   a voltage regulator having an input side and an output side;
   said input side of said voltage regulator being electrically connected to an output side of said rectifier;
   an electrical energy store electrically connected to said voltage regulator and configured to receive electrical energy from the electromechanical generation means;
   a sensor configured to generate measurement data responsive to sufficient electrical energy being in the electrical energy store;
   first signal transmission means electrically connected to said output side of said voltage regulator and configured to repeatedly transmit a first electromagnetic signal comprising the measurement data responsive to sufficient electrical energy being in the electrical energy store and until there is insufficient electrical energy in the electrical energy store;
   said first signal transmission means comprising a first electromagnetic signal generator subcircuit connected to a transmission antenna;
   signal reception means for receiving a first electromagnetic signal transmitted by said first signal transmission means;
   said signal reception means being adapted to generate a second signal in response to said first electromagnetic signal transmitted by said first signal transmission means; and
   a switch having a first position and a second position;
   said switch being in communication with said signal reception means;
   said switch being adapted to change between said first position and said second position in response to said second signal.

2. The switching system according to claim 1, wherein said electromechanical generation means is selected from the group consisting of a piezoelectric transducer, an electrostrictive element, a magnetostrictive element, and an electromagnetic induction coil.

3. The switching system according to claim 1, further comprising:
   electrical energy storage means having an input side and an output side;
   said input side of said electrical energy storage means being electrically connected to the output side of said voltage regulator;
   whereby said electrical energy storage means is adapted to store an electrical output of said voltage regulator;
   and wherein said electrical energy storage means is adapted to supplement said electrical output of said voltage regulator to said first signal transmission means with said stored electrical output of said voltage regulator.

4. The switching system according to claim 1, further comprising:
   electrical energy storage means having an input side and an output side;
   said input side of said electrical energy storage means being electrically connected to the output side of said rectifier;
   whereby said electrical energy storage means is adapted to store an electrical output of said rectifier;
   and wherein said electrical energy storage means is adapted to supplement electrical output of said voltage regulator to said first signal transmission means with said stored electrical output of said rectifier.

5. A switching system comprising:
   an electromechanical generator for generating an oscillating voltage;
   a rectifier electrically connected to said generator;
   a voltage regulator having an input side and an output side;
   said input side of said voltage regulator being electrically connected to an output side of said rectifier;
   an electrical energy store electrically connected to said voltage regulator and configured to receive electrical energy from the electromechanical generator;
   a sensor configured to generate measurement data responsive to sufficient electrical energy being in the electrical energy store;
   a first signal transmitter electrically connected to said output side of said voltage regulator and configured to repeatedly transmit a first electromagnetic signal comprising the measurement data responsive to sufficient electrical energy being in the electrical energy store and until there is insufficient electrical energy in the electrical energy store;
   said first signal transmitter comprising a first electromagnetic signal generator subcircuit connected to a transmission antenna;
   a signal receiver for receiving a first electromagnetic signal transmitted by said first signal transmitter;
   said signal receiver being adapted to initiate an action in response to said first electromagnetic signal transmitted by said first signal transmitter; and
   a switch having a first condition and a second condition;
   said switch being in communication with said signal receiver;
   said switch being adapted to change between said first condition and said second condition in response to said initiated action.

6. A switching system comprising:
an electromechanical transducer for generating a voltage;
a rectifier electrically connected to said transducer;
a voltage regulating circuit having an input side and an output side;
said input side of said voltage regulating circuit being electrically connected to an output side of said rectifier;
an electrical energy store electrically connected to said voltage regulator and configured to receive electrical energy from the electromechanical transducer;
a sensor configured to generate measurement data responsive to sufficient electrical energy being in the electrical energy store;
a first signal transmitter electrically connected to said output side of said voltage regulating circuit and configured to repeatedly transmit a first electromagnetic signal comprising the measurement data responsive to sufficient electrical energy being in the electrical energy store and until there is insufficient electrical energy in the electrical energy store;
said first signal transmitter comprising a first radiofrequency signal generator connected to a transmission antenna;
a receiver for receiving a first radiofrequency signal transmitted by said first signal transmitter;
said receiver being adapted to initiate an action in response to said first radiofrequency signal transmitted by said first signal transmitter; and
a lamp having a first condition and a second condition;
said lamp being in communication with said receiver;
said lamp being adapted to change between said first condition and said second condition in response to said initiated action.

7. A self-powered switching system, comprising:
an electromechanical generator for generating a voltage across first and second electrical terminals;
a voltage regulator having an input side and an output side;
said input side of said voltage regulator being electrically connected to said first and second electrical terminals;
an electrical energy store electrically connected to said output side of said voltage regulator and configured to receive electrical energy from the electromechanical generator;
a sensor configured to generate measurement data responsive to sufficient electrical energy being in the electrical energy store;
a first signal transmission means electrically connected to said electrical energy store and configured to repeatedly transmit a first electromagnetic signal comprising the measurement data responsive to sufficient electrical energy being in the electrical energy store and until there is insufficient electrical energy in the electrical energy store;
said first signal transmission means comprising a first electromagnetic signal generator subcircuit connected to a transmitter; and
a first tone generator subcircuit having an input side and an output side;
said input side of said tone generator subcircuit being connected to said output side of said voltage regulator;
said output side of said tone generator subcircuit being connected to said first electromagnetic signal generator subcircuit;
wherein said first tone generator and said first electromagnetic signal generator subcircuits comprise a first at least one programmable encoder circuit;
and wherein each of said first programmable encoder circuits is adapted to be programmed to generate one or more unique codes;
and wherein each of said unique codes generated by each of said first programmable encoder circuits is different from each of said unique codes generated by the others of said first programmable encoder circuits;
signal reception means for receiving a first electromagnetic signal transmitted by said first signal transmission means;
said signal reception means being adapted to generate a second signal ii response to said first electromagnetic signal transmitted by said first signal transmission means; and
a switch having a first position and a second position;
said switch being in communication with said signal reception means;
said switch being adapted to change between said first position and said second position in response to said second signal.

8. The switching system according to claim 7, further comprising:
second signal transmission means comprising a second at least one programmable encoder circuit connected to an antenna;
each of said second programmable encoder circuits comprising a second radio frequency generator subcircuit and a second tone generator subcircuit;
wherein each of said second programmable encoder circuits is adapted to be programmed to generate one or more unique codes;
and wherein each of said unique codes generated by each of said second programmable encoder circuits is different from each of said unique codes generated by each of said first programmable encoder circuits, and different from each of said unique codes generated by the others of said second programmable encoder circuits.

9. A self-powered switching system, comprising:
an electromechanical transducer for voltage generation;
a voltage regulator having an input side and an output side;
said input side of said voltage regulator being electrically connected to said electromechanical transducer;
an electrical energy store electrically connected to said output side of said voltage regulator and configured to receive electrical energy from the electromechanical transducer;
a sensor configured to generate measurement data responsive to sufficient electrical energy being in the electrical energy store;
a first signal transmitter configured to repeatedly transmit a first electromagnetic signal comprising the measurement data responsive to sufficient electrical energy being in the electrical energy store and until there is insufficient electrical energy in the electrical energy store;
said first signal transmitter comprising a first logic circuit connected to a transmitter; and
a first clock generator subcircuit having an input side and an output side;
said input side of said first clock generator subcircuit being connected to said output side of said voltage regulator;
said output side of said first clock generator subcircuit being connected to said first logic circuit;

wherein said first clock generator subcircuit and said first logic circuit comprise a first at least one programmable encoder circuit;

and wherein each of said first programmable encoder circuits is adapted to be programmed to generate one or more codes;

and wherein each of said codes generated by each of said first programmable encoder circuits identifies said first programmable encoder circuit;

signal reception means for receiving a first electromagnetic signal transmitted by said first signal transmitter;

said signal reception means being adapted to initiate an action in response to said first electromagnetic signal transmitted by said first signal transmitter; and a switch having a first position and a second position;

said switch being in communication with said signal reception means;

said switch being adapted to change between said first position and said second position in response to said signal reception means.

10. An energy self-sufficient apparatus, comprising:

an electromechanical transducer;

a voltage regulating circuit;

an input of said voltage regulating circuit being electrically connected to said electromechanical transducer;

an electrical energy store electrically connected to said voltage regulator and configured to receive electrical energy from said electromechanical transducer;

a sensor configured to generate measurement data responsive to sufficient electrical energy being in the electrical energy store;

a radio frequency transmission stage configured to repeatedly transmit a first electromagnetic signal comprising the measurement data responsive to sufficient electrical energy being in the electrical energy store and until there is insufficient electrical energy in the electrical energy store;

a radiofrequency transmitter comprising a first logic circuit configuration connected to said radio frequency transmission stage; and a first clock generator;

an input side of said first clock generator being connected to an output side of said voltage regulating circuit;

an output side of said first clock generator being connected to said first logic circuit configuration;

wherein said first clock generator and said first logic circuit configuration comprise at least one microprocessor;

and wherein each of said microprocessors is adapted to read out at least one identification code;

a receiver adapted to receiving a radiofrequency telegram transmitted by said radio frequency transmission stage;

said receiver being adapted to initiate an action in response to said radiofrequency telegram transmitted by said radio frequency transmission stage; and a switch having an on position and an off position;

said switch being in communication with said receiver;

said switch being adapted to change between said on position and said off position in response to said receiver.

11. The apparatus according to claim 10, further comprising:

a second signal transmission means comprising a second at least one microprocessor connected to a transmission antenna;

each of said second signal transmission means comprising a second radio frequency transmission stage and a second clock generator;

and wherein each of said second microprocessors is adapted to read out at least one identification code.

12. An energy self-sufficient apparatus, comprising:

an electromechanical transducer;

a voltage regulating circuit;

an input of said voltage regulating circuit being electrically connected to said electromechanical transducer;

an electrical energy store electrically connected to said voltage regulator and configured to receive electrical energy from the electromechanical transducer;

a sensor configured to generate measurement data responsive to sufficient electrical energy being in the electrical energy store;

a first radio frequency transmission stage configured to repeatedly transmit a first electromagnetic signal comprising the measurement data responsive to sufficient electrical energy being in the electrical energy store and until there is insufficient electrical energy in the electrical energy store;

a radiofrequency transmitter comprising a first logic circuit configuration connected to said first radio frequency transmission stage; and a first clock generator;

an input side of said first clock generator being connected to an output side of said voltage regulating circuit;

an output side of said first clock generator being connected to said logic circuit configuration;

wherein said first clock generator and said first logic circuit configuration comprise at least one microprocessor;

and wherein each of said microprocessors is adapted to use a key, wherein each key is different;

a receiver adapted to receiving a radiofrequency telegram transmitted by said first radio frequency transmission stage;

said receiver being adapted to initiate an action in response to said radiofrequency telegram transmitted by said first radio frequency transmission stage; and a switch having an on position and an off position;

said switch being in communication with said receiver;

said switch being adapted to change between said on position and said off position in response to said receiver.

* * * * *